United States Patent [19]

Douglas

[11] 4,209,080
[45] Jun. 24, 1980

[54] SNAP-FIT LUBRICANT PICK-UP TUBE FOR A MOTOR COMPRESSOR

[75] Inventor: James L. Douglas, Adrian, Mich.

[73] Assignee: Tecumseh Products Company, Tecumseh, Mich.

[21] Appl. No.: 961,104

[22] Filed: Nov. 16, 1978

[51] Int. Cl.² .............................................. F04B 39/02
[52] U.S. Cl. .................... 184/6.16; 285/319; 415/88; 417/372; 417/902
[58] Field of Search .............. 184/6.16; 417/902, 372; 415/88; 285/319, DIG. 22

[56] References Cited

U.S. PATENT DOCUMENTS

| 502,269 | 8/1893 | Baldwin | 285/319 X |
|---|---|---|---|
| 2,766,027 | 10/1956 | Herr | 415/88 UX |
| 3,410,478 | 11/1968 | Geisenhaver | 417/902 X |
| 3,413,021 | 11/1968 | Potts | 285/319 |
| 3,441,202 | 4/1969 | Valbjorn et al. | 417/902 X |
| 3,544,240 | 12/1970 | Rundell | 417/372 X |
| 3,653,248 | 4/1972 | Leffers | 415/88 X |
| 3,937,547 | 2/1976 | Lee-Kemp | 285/319 X |
| 4,064,900 | 12/1977 | Schmitt | 285/DIG. 22 X |
| 4,097,185 | 6/1978 | Wolf | 415/88 |
| 4,128,264 | 12/1978 | Oldford | 285/319 X |

Primary Examiner—David H. Brown
Attorney, Agent, or Firm—Albert L. Jeffers; John F. Hoffman

[57] ABSTRACT

A lubricating device for use in hermetic compressors and the like wherein a rotating oil pick-up tube is partially immersed in the oil in the compressor sump, and pumps the oil upwardly by means of centrifugal action to the compressor parts which are to be lubricated. The compressor includes a vertical shaft to which the pick-up tube is connected, wherein the shaft has an open hollow lower end including a pair of locking openings in the inner surface of the hollow portion. A molded plastic oil pick-up tube, which is bifurcated at one end so as to form a pair of resilient locking arms, is inserted into the shaft until a pair of locking nibs snap into the corresponding locking openings. In order to properly orient the pick-up tube about its axis so that the locking nibs are aligned with the corresponding openings, a pair of protruding locking ears on the tube are axially aligned with a pair of corresponding slots in the lower edge of the shaft.

12 Claims, 5 Drawing Figures

SNAP-FIT LUBRICANT PICK-UP TUBE FOR A MOTOR COMPRESSOR

BACKGROUND OF THE INVENTION

The present invention relates to a centrifugal lubricant pick-up tube of the type suitable for use in hermetic motor compressors, and in particular to such a tube which is capable of being snap fit into the compressor shaft so as to facilitate assembly.

In hermetic motor compressors, which are sealed units, the bearing regions are often lubricated by means of a lubricant pick-up tube, which is rotated about its longitudinal axis and has one end immersed in the compressor lubricant sump. The tube is mounted on the shaft of the compressor and exerts a centrifugal pumping action on the lubricant which flows through the lower open end of the tube. The tube propels the lubricant upwardly by means of centrifugal action to passageways in the shaft, which leads to the bearing regions of the compressor. Such pick-up tubes are disclosed, for example, in U.S. Pat. Nos. 3,451,615, 3,410,478 and 4,079,185.

In the past, such pick-up tubes have often been made of deep draw quality cold rolled steel, wherein sheet steel is die blanked into a circular disc and then progressively drawn first into a cup shape and then, in subsequent draws, into an elongated, generally cylindrical tube of uniform diameter. The final shape for the tube is accomplished by subsequent forming operations, including drawing, swaging, and piercing. The tube may be provided with a copper flash finish, if desired. The tube is then removably or permanently press-fit in the compressor shaft.

The obvious disadvantage to such a pick-up tube lies in the number of operations which are necessary to form it. Furthermore, the operation of assembling it to the compressor shaft by a press fit requires the use of special machinery.

SUMMARY OF THE INVENTION

The present invention overcomes the disadvantages of the prior art centrifugal oil pick-up tube lubricating devices by providing a pick-up tube made of integral molded plastic, which can be manually inserted into the compressor shaft and snap fit in place. Such an arrangement results in substantial savings in manufacturing costs for the tube itself and, additionally, simplifies the assembling operation by eliminating the necessity for specialized press-fit machinery.

Specifically, the present invention relates to a lubricating device for use in a hermetic compressor comprising a shaft adapted to be rotated vertically in the compressor and rotated about its longitudinal axis, wherein the shaft has an open, hollow, lower end terminating in a lower edge and an inner surface extending upwardly from the lower edge including at least one locking opening therein. A lubricant pick-up tube having an inlet opening at one end and an outlet opening at the other end is bifurcated along said other end, with the furcations forming a pair of resilient locking arms, both of said arms having a projecting locking nib thereon. The pick-up tube is inserted into the compressor shaft with the locking nibs being snap fit in the corresponding locking opening so as to lock the pick-up tube in place.

The method according to the present invention comprises the steps of: providing a depending shaft in the compressor rotatable about its longitudinal axis by the compressor, wherein the shaft includes an open hollow lower end with an internal inner surface and a locking opening therein, providing a centrifugaltype lubricant pick-up tube bifurcated at one end along its longitudinal axis, with the furcations forming a pair of resilient locking arms, and having a locking nib on both of the arms, inserting the two locking arms into the shaft lower end with the arms being deflected inwardly by the shaft inner surface, and radially aligning the locking nibs and opening whereupon the locking nibs snap into the locking opening as the arms spring outwardly, thereby locking the tube in place.

It is an object of the present invention to provide a lubricating device for use in hermetic compressors, which is made of a resilient plastic material, and may be locked to the compressor shaft by means of a snap fit.

DETAILED DESCRIPTION

Figure 1:
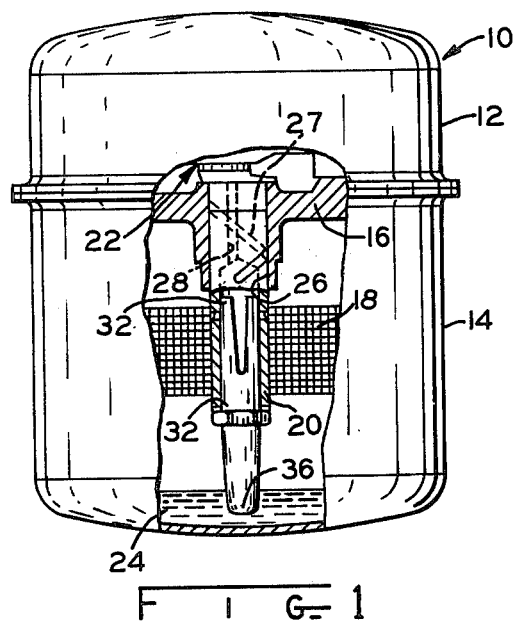
FIG. 1 is an elevational view, partially broken away, of a hermetic motor compressor unit incorporating the pick-up tube of the present invention.

Referring now to the drawings in detail and in particular to FIG. 1, hermetic compressor motor unit 10 comprises an outer casing having upper and lower shells 12 and 14, and a cast frame 16, the upper end of which embodies the compressor proper, which may be of the piston-cylinder type. At the lower end of frame 16, is located a motor having a rotor 18 connected to shaft 20, which is the shaft by which the compressor 22 is driven.

In the bottom of lower casing shell 14 is contained liquid 24 comprising a refrigerant fluid and a lubricating fluid. This fluid 24 is propelled upwardly at least to bearing region 26 through passageway 27 and on upwardly and out the upper end of shaft 20 via passageway 28. Passageway 28 is preferably offset laterally from the axis of shaft 20.

The lubricant pick-up tube 30 according to the present invention comprises a tubular body 32 made of an injection molded thermoplastic, such as Valox 420, having an upper end 34 and tapering lower end 36, respectively. The lower end 36 has an axial opening 38 for the passage of lubricant from the compressor sump to the interior of tube 30, and a diametrally positioned impeller blade 40 extending from a point spaced approximately 0.040 inches above the inside bottom of open 38 to a point slightly above the midpoint of tube 32. Preferably, blade 40 is molded integrally with tube 32.

The upper end 34 of tube 32 is bifurcated as by a pair of V-shaped slots 42 so as to form a pair of generally parallel locking arms 44 and 46. Due to the slightly resilient nature of the material forming tube 32 and the presence of slots 42, arms 44 and 46 are resilient and can be deflected inwardly toward the longitudinal axis of tube 32. A pair of locking nibs 48 and 50 are integral with arms 44 and 46, respectively, and project radially outward therefrom. It will be noted that locking nibs 48 and 50 are generally cylindrical in shape and have end surfaces 52 and 54 which slant inwardly in the upward direction.

A hexagonal collar 56 encircles tube 32 at about the longitudinal midpoint thereof, and includes a pair of locating ears 58 and 60 extending upwardly therefrom.

Shaft 20 is hollow and open on its lower end, and has a generally cylindrical inner surface 62. A pair of locking openings 64 and 66 extend radially inward through shaft 20 and are dimensioned so as to receive locking nibs 48 and 54 in the manner which will be described below. The lower edge 68 of shaft 20 is provided with a pair of locating slots 70 and 72, which are dimensioned to receive locating ears 58 and 60.

Figure 5:
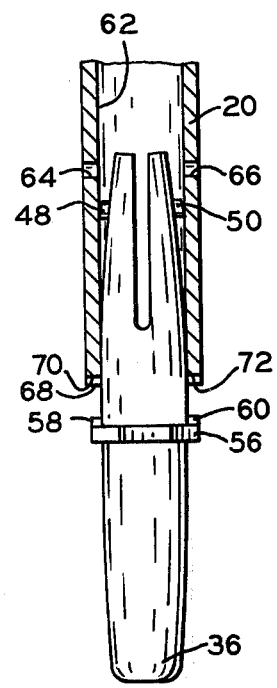
FIG. 5 is a fragmentary elevational view of the compressor unit and pick-up tube, wherein the pick-up tube is shown partially inserted into the compressor shaft.
Figures 2, 3:
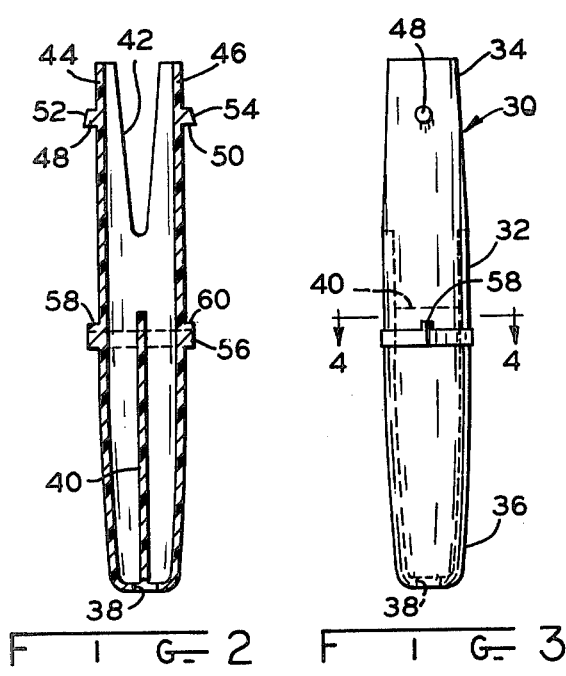
FIG. 2 is a longitudinal sectional view of the pick-up tube.
FIG. 3 is an elevational view of the pick-up tube shown in FIG. 2 turned 90° on its longitudinal axis.
Figure 4:
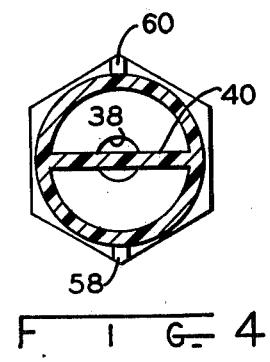
FIG. 4 is a sectional view taken along line 4—4 of FIG. 3.

To assemble pick-up tube 32 to compressor 22, locking arms 44 and 46 are inserted into the lower end of shaft 20, and tube 30 is pushed upwardly. Locking nibs 48 and 50 will ride over the lower edge 68 of shaft 20 thereby causing arms 44 and 46 to be deflected inwardly to the approximate positions illustrated in FIG. 5. It may be necessary to physically press arms 44 and 46 slightly inwardly as it is being inserted to permit locking nibs 48 and 46 to clear lower edge 68. Tube 30 is pushed up into shaft 20 until the locating ears 58 and 60 of collar 56 contact the lower edge 68 of shaft 20. Tube 30 is then turned on its longitudinal axis by hexagonal collar 56 until locating ears 58 and 60 align with slots 70 and 72 in shaft 20, and tube 30 is then pushed in until the locking nibs 48 and 54 snap into locking openings 64 and 66. In this position, hexagonal collar 56 will seat against lower edge 68 and the tube 30 is locked in place for operation.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A lubricating device for use in hermetic compressors and the like comprising:
    a shaft adapted to be disposed vertically in the compressor and rotated about its longitudinal axis, said shaft having an open hollow lower end terminating in a lower edge,
    said hollow lower end including an inner surface extending upwardly from said lower edge and further including a pair of locking openings in said inner surface,
    a lubricant pick-up tube having an inlet opening at one end and an outlet opening at the other end thereof, said other end of said tube being bifurcated along the longitudinal axis of said tube, with the furcations forming a pair of resilient locking arms,
    an outwardly projecting locking nib on each of said arms, said locking arms being received in said shaft lower end with said locking nibs being snap fit in said locking openings,
    seating means projecting outwardly from said pickup tube adapted to abut said shaft lower edge when said tube is inserted into said shaft lower end with said locking nibs snap fit in said locking openings, and
    an outwardly projecting locating ear on said tube received in a corresponding slot in said shaft lower edge, said locking nib, locking opening, locating slot and locating ear being pre-oriented relative to each other so that said nib and locking opening will be axially aligned when said locating slot and ear are axially aligned, whereby said tube can be properly oriented when it is inserted in said shaft lower end.

2. The lubricating device of claim 1 wherein said tube consists of an integral molded plastic unit.

3. A lubricating device adapted to be snap fit in a hollow, vertically disposed shaft of a motor compressor, said lubricating device being a lubricant pick-up tube comprising: a tubular member having an inlet opening at one end and an outlet opening at the other end, said other end of said tubular member having a portion thereof being bifurcated along the longitudinal direction thereof with the furcations forming a pair of resilient locking arms, an outwardly projecting locking nib on at least one of said arms, an annular collar encircling said tube intermediate said ends, at least one locating ear extending axially away from said collar toward said other end, said locking nib and locating ear being precisely oriented with respect to each other so that when the device is inserted into the shaft, both the nib and ear will engage with respective corresponding openings in the shaft and an impeller blade disposed substantially diametrically inside the lower portion of said tube.

4. A lubricating device for use in a hermetic compressor and the like comprising:
    a shaft adapted to be disposed vertically in the compressor and rotated about its longitudinal axis, said shaft having an open hollow lower end terminating in a lower edge,
    said hollow lower end including an inner surface extending upwardly from said lower edge and further including a locking opening in said inner surface,
    a lubricant pick-up tube having an inlet opening at one end and an outlet opening at the other end thereof, at least a portion of said other end of said tube being bifurcated along the longitudinal direction of said tube, with the furcations forming a pair of resilient locking arms,
    an outwardly projecting locking nib on one of said arms,
    said locking arms being received in said shaft lower end with said locking nib being snap fit in said locking openings, and
    a pair of cooperating locating elements respectively on said shaft lower end and said pick-up tube, said locating elements and said locking nib and said locking opening being pre-oriented with respect to each other such that said locking opening and locking nib will be axially aligned when said locating elements are axially aligned.

5. The lubricating device of claim 4 including a second outwardly projecting locking nib on the other of said arms snap fit in a second locking opening in said inner surface.

6. The lubricating device of claim 4 wherein said pick-up tube consists of an integral molded plastic unit.

7. The lubricating device of claim 6 wherein said pick-up tube includes an impeller blade therein.

8. The lubricating device of claim 4 including seating means projecting radially outward from said pick-up tube adapted to abut said shaft lower edge when said tube is inserted into said shaft lower end with said locking nib snap fit in said locking opening.

9. The lubricating device of claim 8 wherein said seating means includes an annular collar adapted to be seated against said shaft lower edge.

10. The lubricating device of claim 4 wherein said locating elements comprise a locating slot in the lower end of said shaft and a locating ear on said seating means received in said slot when said locking nib is received in said locking opening.

11. A lubricating device for use in a hermetic compressor and the like comprising:
   a shaft adapted to be disposed vertically in the compressor and rotated about its longitudinal axis, said shaft having an open hollow lower end terminating in a lower edge,
   said hollow lower end including an inner surface extending upwardly from said lower edge and further including a locking opening in said inner surface,
   a lubricant pick-up tube having an inlet opening at one end and an outlet opening at the other end thereof, at least a portion of said other end of said tube being bifurcated along the longitudinal direction of said tube, with the furcations forming a pair of resilient locking arms,
   an outwardly projecting locking nib on one of said arms,
   said locking arms being received in said shaft lower end with said locking nib being snap-fit in said locking opening,
   a locating slot in said shaft lower edge and an outwardly projecting locating ear on said pick-up tube received in said slot,
   said locking nib, locking opening, locating slot and locating ear being pre-oriented relative to each other so that said nib and locking opening will be axially aligned when said locating slot and ear are axially aligned, whereby said tube can be properly oriented when it is inserted in said shaft lower end.

12. In a compressor, the method of assembling a centrifugal lubricating device comprising:
   providing a depending shaft in said compressor adapted to be rotated about its longitudinal axis by said compressor, said shaft including an open hollow lower end with an inner surface and a locking opening in said surface,
   providing a centrifugal-type lubricant pick-up tube being bifurcated at one end along the longitudinal axis thereof with the furcations forming a pair of resilient locking arms, at least one of the arms including a locking nib adapted to lock together with the locking opening,
   inserting the tube locking arms into the shaft lower end with the arms being deflected inwardly by the shaft inner surface,
   axially aligning a pair of locating elements on the shaft lower end and the pick-up tube, respectively, and
   radially aligning the locking nib and locking opening whereupon the locking nib snaps into the locking opening as the arms snap outwardly, thereby locking the tube in place.

* * * * *